(12) United States Patent
Lee

(10) Patent No.: US 10,635,862 B2
(45) Date of Patent: Apr. 28, 2020

(54) METHOD OF FACILITATING NATURAL LANGUAGE INTERACTIONS, A METHOD OF SIMPLIFYING AN EXPRESSION AND A SYSTEM THEREOF

(71) Applicant: City University of Hong Kong, Kowloon (HK)

(72) Inventor: John Sie Yuen Lee, Shek Tong Tsui (HK)

(73) Assignee: City University of Hong Kong, Kowloon (HK)

( * ) Notice: Subject to any disclaimer, the term of this patent is extended or adjusted under 35 U.S.C. 154(b) by 20 days.

(21) Appl. No.: 15/849,927

(22) Filed: Dec. 21, 2017

(65) Prior Publication Data
US 2019/0197114 A1    Jun. 27, 2019

(51) Int. Cl.
| | | |
|---|---|---|
| G06F 17/00 | (2019.01) | |
| G06F 40/40 | (2020.01) | |
| G06N 5/04 | (2006.01) | |
| G06F 40/30 | (2020.01) | |
| G06F 40/205 | (2020.01) | |
| G06F 40/284 | (2020.01) | |
| G06F 40/289 | (2020.01) | |

(52) U.S. Cl.
CPC ............ *G06F 40/40* (2020.01); *G06F 40/205* (2020.01); *G06F 40/284* (2020.01); *G06F 40/289* (2020.01); *G06F 40/30* (2020.01); *G06N 5/04* (2013.01)

(58) Field of Classification Search
CPC ... G06F 17/271; G06F 17/274; G06F 17/2785

USPC ............................................................ 704/9
See application file for complete search history.

(56) References Cited

U.S. PATENT DOCUMENTS

| | | | | |
|---|---|---|---|---|
| 6,023,669 A * | 2/2000 | Suda | ................. | G06F 17/279 704/2 |
| 10,282,413 B2 * | 5/2019 | Ji | ................. | G06F 17/27 |
| 2002/0010573 A1 * | 1/2002 | Wakita | ................. | G06F 17/2795 704/2 |
| 2003/0004716 A1 * | 1/2003 | Haigh | ................. | G10L 15/10 704/238 |
| 2004/0034520 A1 * | 2/2004 | Langkilde-Geary | | ................. G06F 17/2881 704/1 |
| 2009/0089045 A1 * | 4/2009 | Lenat | ................. | G06F 17/2785 704/9 |
| 2014/0249804 A1 * | 9/2014 | Jackson | ................. | G06F 17/28 704/9 |

* cited by examiner

*Primary Examiner* — Daniel Abebe
(74) *Attorney, Agent, or Firm* — Renner, Kenner, Greive, Bobak, Taylor & Weber

(57) ABSTRACT

A method of facilitating natural language interactions, a method of simplifying an expression, a system for facilitating natural language interactions, and a system for simplifying an expression. The method of facilitating natural language interactions includes the steps of: processing a corpus to select a natural language expression from the corpus; simplifying the selected natural language expression into a plurality of simplified expression portions; wherein the plurality of simplified expression portions is representative of the meaning of the selected natural language expression; and presenting the plurality of simplified expression portions to a user so as to receive a user expression from the user for comparison with the selected natural language expression.

22 Claims, 6 Drawing Sheets

METHOD OF FACILITATING NATURAL LANGUAGE INTERACTIONS, A METHOD OF SIMPLIFYING AN EXPRESSION AND A SYSTEM THEREOF

TECHNICAL FIELD

The present invention relates to a method of facilitating natural language interactions, a method of processing a natural language expression and a system of the same, and particularly, although not exclusively, to a method of facilitating natural language interactions, a method of processing a natural language expression and a system of the same for language learning.

BACKGROUND

A sentence may include words grouped meaningfully to express a statement, question, exclamation, request, command or suggestion. In principle, a set of words constructing the sentence tells the reader a complete thought or an idea. To effectively deliver an accurate message to the reader, the sentence needs to be constructed in a proper format and complying with specific rules, such as grammatical rules, tenses etc.

SUMMARY OF THE INVENTION

In accordance with a first aspect of the present invention, there is provided a method of facilitating natural language interactions comprising the steps of:
  processing a corpus to select a natural language expression from the corpus;
  simplifying the selected natural language expression into a plurality of simplified expression portions; wherein the plurality of simplified expression portions is representative of the meaning of the selected natural language expression; and,
  presenting the plurality of simplified expression portions to a user so as to receive a user expression from the user for comparison with the selected natural language expression.

In an embodiment of the first aspect, the user expression is compared with the selected natural language expression by comparing the natural language meaning and/or structure of the user expression and the selected natural language expression.

In an embodiment of the first aspect, the comparison devises a score based on the similarity of the user expression with the selected natural language expression.

In an embodiment of the first aspect, the step of processing a corpus to select a natural language expression includes selecting the natural language expression based on a user desired characteristics.

In an embodiment of the first aspect, the user desired characteristics include expression type, expression complexity, subject domain, vocabulary level or any one or more thereof.

In an embodiment of the first aspect, the corpus comprises a plurality of expressions and a plurality of indication associated with the characteristic of the expressions.

In an embodiment of the first aspect, the selected natural language expression comprises one or more complete sentences each having a comprehensive meaning.

In an embodiment of the first aspect, each of the simplified expression portions comprises a shortened sentence partially representative of the meaning of the selected natural language expression.

In an embodiment of the first aspect, the user expression comprises lesser number of expressions representative of the meaning of the plurality of simplified expression portions.

In an embodiment of the first aspect, the expression type is associated with the complexity of the structure of the selected natural language expression.

In an embodiment of the first aspect, the expression complexity is associated with the desired number and/or format of the simplified expression portion presented to the user.

In an embodiment of the first aspect, the subject domain is associated with a user desired interest area.

In an embodiment of the first aspect, the vocabulary level is dependent upon the desirable vocabulary source selected by the user.

In accordance with a second aspect of the present invention, there is provided a method of processing a natural language expression comprising the steps of:
  parsing the natural language expression to identify one or more expression types;
  using the identified one or more expression types to generate a plurality of simplified expression portions; wherein the plurality of simplified expression portions is representative of the meaning of the natural language expression; and,
  wherein the step of generating the plurality of simplified expression portions includes selecting the one or more expression types for use to generate the plurality of simplified expression portions based on one or more pre-trained conditions.

In an embodiment of the second aspect, the method of processing a natural language expression further includes the step of regenerating the plurality of simplified expression portions.

In an embodiment of the second aspect, the natural language expression is parsed to identify the expression type by analysing the meaning and/or structure of the natural language expression.

In an embodiment of the second aspect, the step of parsing the natural language expression includes forming a plurality of tokens from the parsed natural language expression based on the identified type of the natural language expression.

In an embodiment of the second aspect, the step of parsing the natural language expression further includes determining the relationship between the meaning of the formed plurality of tokens.

In an embodiment of the second aspect, the step of generating the plurality of simplified expression portions further includes generating the plurality of simplified expression portions based on the determined relationship.

In an embodiment of the second aspect, the natural language expression for generating the plurality of simplified expression portions is processed by a predetermined decision tree with the pre-trained conditions to determine the feasibility of the generating of the plurality of simplified expression portions.

In an embodiment of the second aspect, the plurality of simplified expression portions is generated from the processed natural language expression if all the pre-trained conditions in the decision tree are satisfied.

In an embodiment of the second aspect, the processing of the decision tree is terminated if one of the pre-trained conditions of the decision tree is not satisfied.

In an embodiment of the second aspect, each of the formed plurality of tokens is representative of a characteristic of the natural language expression.

In an embodiment of the second aspect, the plurality of simplified expression portions is regenerated based on one or more predetermined conditions associated with the structure of the plurality of simplified expression portions.

In accordance with a third aspect of the present invention, there is provided a system for facilitating natural language interactions comprising:
- a corpus selection module arranged to process a corpus to select a natural language expression from the corpus;
- an expression simplification processor arranged to simplify the selected natural language expression into a plurality of simplified expression portions; wherein the plurality of simplified expression portions is representative of the meaning of the selected natural language expression; and,
- a comparison interface arranged to present the plurality of simplified expression portions to a user so as to receive a user expression from the user for comparison with the selected natural language expression.

In an embodiment of the third aspect, the comparison interface compares the natural language meaning and/or structure of the user expression and the selected natural language expression.

In an embodiment of the third aspect, the comparison interface devises a score based on the similarity of the user expression with the selected natural language expression.

In an embodiment of the third aspect, the system further comprises a characteristic selection module arranged to select the natural language expression based on a user desired characteristics.

In an embodiment of the third aspect, the user desired characteristics include expression type, expression complexity, subject domain, vocabulary level or any one or more thereof.

In an embodiment of the third aspect, the corpus comprises a plurality of expressions and a plurality of indication associated with the characteristic of the expressions.

In an embodiment of the third aspect, the selected natural language expression comprises one or more complete sentences each having a comprehensive meaning.

In an embodiment of the third aspect, each of the simplified expression portions comprises a shortened sentence partially representative of the meaning of the selected natural language expression.

In an embodiment of the third aspect, the user expression comprises lesser number of expressions representative of the meaning of the plurality of simplified expression portions.

In an embodiment of the third aspect, the expression type is associated with the complexity of the structure of the selected natural language expression.

In an embodiment of the third aspect, the expression complexity is associated with the desired number and/or format of the simplified expression portion presented to the user.

In an embodiment of the third aspect, the subject domain is associated with a user desired interest area.

In an embodiment of the third aspect, the vocabulary level is dependent upon the desirable vocabulary source selected by the user.

In accordance with a fourth aspect of the present invention, there is provided a system for processing a natural language expression comprising:
- a parsing module arranged to parse the natural language expression to identify one or more expression types;
- an expression generator arranged to use the identified one or more expression types to generate a plurality of simplified expression portions; wherein the plurality of simplified expression portions is representative of the meaning of the natural language expression; and,
- wherein the one or more expression types is selected for use to generate the plurality of simplified expression portions based on one or more pre-trained conditions.

In an embodiment of the fourth aspect, the plurality of simplified expression portions are regenerated to a plurality of regenerated expression portions.

In an embodiment of the fourth aspect, the parsing module parses the natural language expression to identify the expression type by analysing the meaning and/or structure of the natural language expression.

In an embodiment of the fourth aspect, the parsing module forms a plurality of tokens from the parsed natural language expression based on the identified type of the natural language expression.

In an embodiment of the fourth aspect, the parsing module determines the relationship between the meaning of the formed plurality of tokens.

In an embodiment of the fourth aspect, the expression generator generates the plurality of simplified expression portions based on the determined relationship.

In an embodiment of the fourth aspect, the system for processing a natural language expression further comprises a predetermined decision tree with the pre-trained conditions to determine the feasibility of the generating of the plurality of simplified expression portions.

In an embodiment of the fourth aspect, the plurality of simplified expression portions is generated from the processed natural language expression if all the pre-trained conditions in the decision tree are satisfied.

In an embodiment of the fourth aspect, the processing of the decision tree is terminated if one of the pre-trained conditions of the decision tree is not satisfied.

In accordance with a fifth aspect of the present invention, there is provided a method of facilitating natural language interactions, wherein the selected natural language expression is simplified into a plurality of simplified expression portions based on the result from the method of processing a natural language expression of the present invention.

In accordance with a sixth aspect of the present invention, there is provided a system for facilitating natural language interactions, wherein the expression simplification processor simplifies the selected natural language expression into a plurality of simplified expression portions based on the result from the system for processing a natural language expression of the present invention.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Complex sentence contains multiple clauses, or simple sentences, joined together by conjunctions. In formal writing, repeated use of simple sentences makes a text look crude and monotonous to read. To improve the flow of the text, and to make more sophisticated points, a writer needs to be able to construct complex sentences.

For students of English as a second language (ESL), composition of a complex sentence is an important part of the curriculum. As composition exercises, students are typically given two or more simple sentences (e.g., "The teacher entered the classroom" and "He was carrying lots of books"), which they must combine to form a complex sentence ("The teacher, carrying lots of books, entered the classroom."). Currently, language teachers author these exercise items manually, which is a time consuming process.

The inventors have, through their own research, trials and experiments, devised the present computer-assisted language learning (CALL) system for enabling the automatic generation of these exercise items to the user, thereby helping the user to learn a language. For instance, the system splits a complex sentence into multiple sentences on the basis of seven constructs: coordination, subordination, punctuation, adjectival clauses, participial clauses, and appositive phrases.

Figure 1:
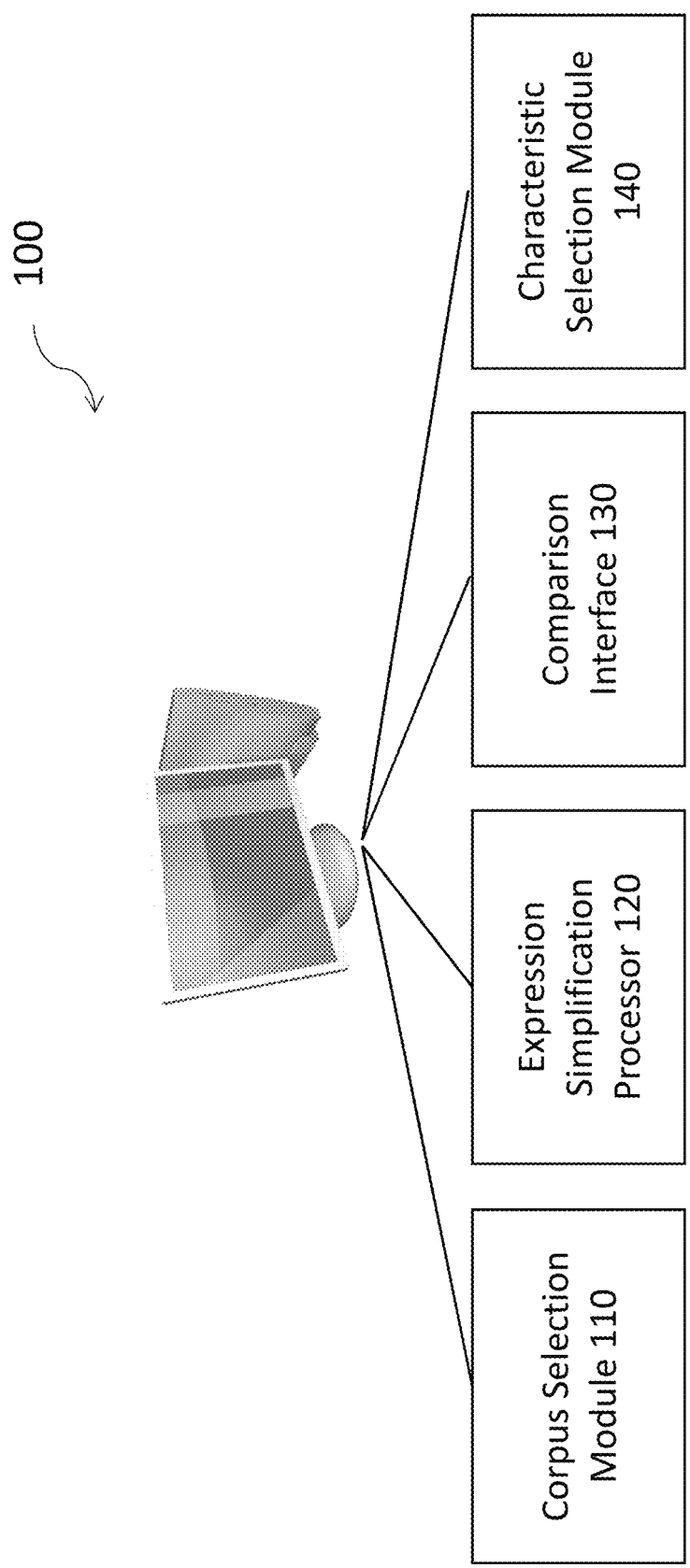
FIG. 1 is a schematic diagram showing the principal components of a system for facilitating natural language interactions in accordance with one embodiment of the present invention.

With reference initially to FIG. 1, there is provided an example embodiment of a system 100 for facilitating natural language interactions comprising: corpus selection module 110 arranged to process a corpus 20 to select a natural language expression 22 from the corpus 20; expression simplification processor 120 arranged to simplify the selected natural language expression 22 into a plurality of simplified expression portions 24, 26; wherein the plurality of simplified expression portions 24, 26 is representative of the meaning of the selected natural language expression 22; and a comparison interface 130 arranged to present the plurality of simplified expression portions 24, 26 to a user so as to receive a user expression 30 from the user for comparison with the selected natural language expression 22.

The corpus 20 is a trained text corpus comprising a plurality of expressions and indications 55 i.e. semantic labels, each of which is associated with the characteristic of each of these expressions. For instance, the corpus 20 may be a large pool of sentences or a database sourced from e.g. a dump of the online database or a collection of newspapers. In such pool/database, there are many sentences of varying complexity. For each of these sentences, its complexity level and suitability for splitting is checked and such characteristic is indicated by its associated semantic label 55. Ultimately, the system 100 may split the sentences up into two or more simply sentences or sentences that are simpler i.e. shorter, less complex or in view of other criteria.

Figure 2:
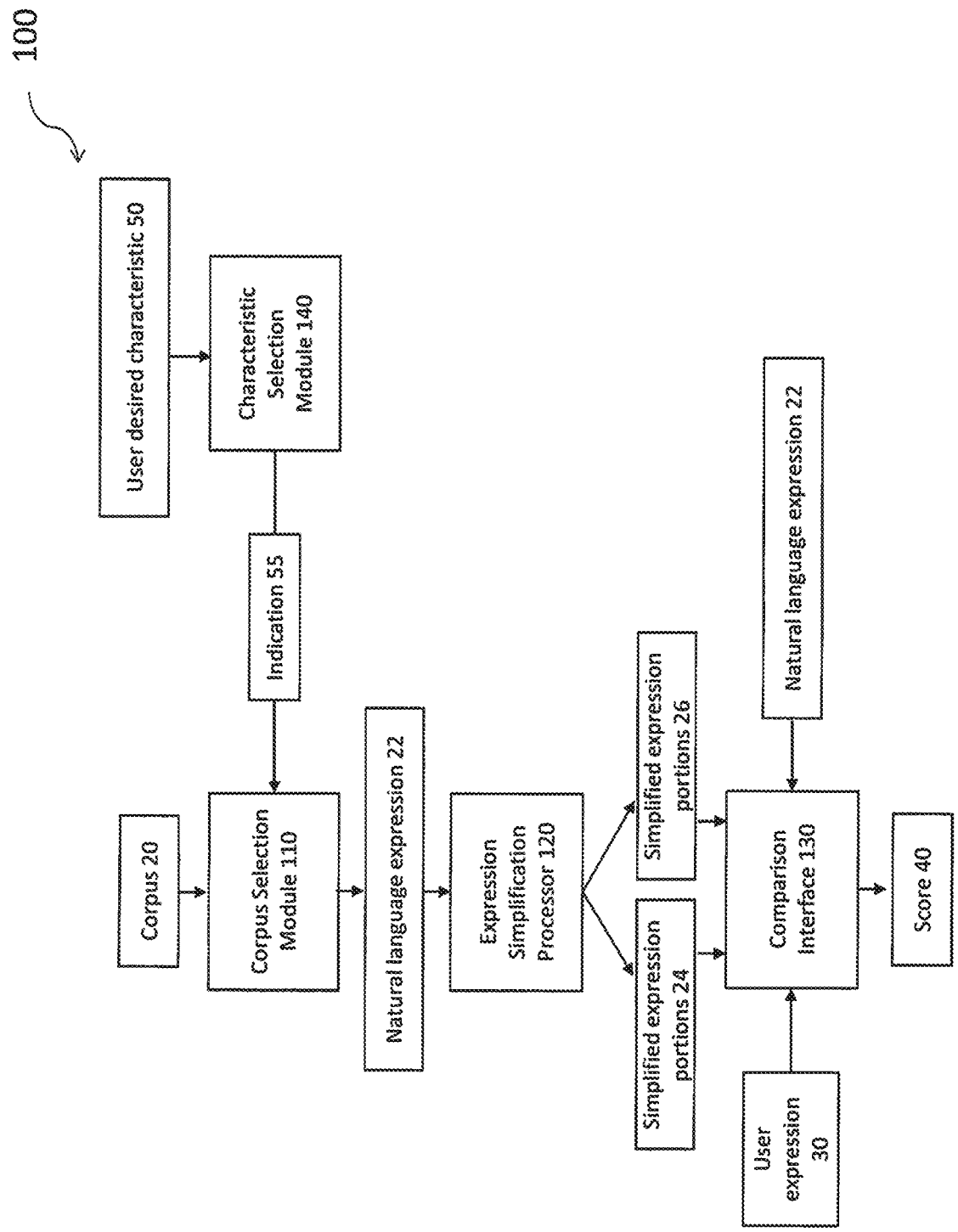
FIG. 2 is a schematic diagram showing the workflow of the system in FIG. 1.

In one example embodiment as shown in FIG. 2, the corpus selection module 110 selects a portion of the corpus 20 as a natural language expression 22, which comprises one or more complete sentences each having a comprehensive meaning. The expression simplification processor 120 simplifies the selected natural language expression 22 into a plurality of simplified expression portions 24, 26, each of which comprises a shortened sentence that is partially representative of the meaning of the selected natural language expression 22.

The comparison interface 130 presents the plurality of simplified expression portions 24, 26 to the user as a language exercise. The user may, with his own discretion, rearrange the plurality of simplified expression portions 24, 26 into one or more user expressions 30 with a lesser number of expressions that is representative of the collective meanings of the simplified expression portions 24, 26.

In some embodiments, the comparison interface 130 compares the natural language meaning and/or structure of the user expression 30 and the selected natural language expression 22, and devises a score 40 based on the similarity of the user expression 30 with the selected natural language expression 22.

For instance, once the selected natural language expression 22 is split up into at least two simplified expression portions 24, 26, the user is asked to read and digest the simplified expression portions 24, 26, and rewrite a combination sentence for expressing the simplified expression portions 24, 26. In order to assess the correctness (e.g. grammatical, conceptual) or elegance of the rewritten sentences, the user expression 30 is compared against the original, natural language expression 22.

In some embodiments, the comparison interface 130 may present the user the original natural language expression 22 and identify any errors presented in the marked user expression 30, for example in a track-changed format. The score 40, reflecting the quality of the user expression 30 with respect to the original natural language expression 22, may be provided together with the track-changed, corrected sentence to the user as feedback. By repetitive of such rewriting exercise, the user is encouraged to write more complex sentences based on some simplifier sentences and in turn, boost up their self-confidence of language proficiency.

Alternatively, the comparison interface 130 may request the user to split a natural language expression 22 into a plurality of shorter, user expressions and the comparison interface 130 may then compare the latter against the original, natural language expressions in the same manner as aforementioned.

Automatic generation not only expedites item authoring, but also provides personalized items to suit the needs of individual learners. For instance, such personalization may include the level of vocabulary, subject domain, as well as the type and complexity of the target sentence. Such personalized language exercise may provide way better user experience and greater flexibility over traditional, manually authored exercise.

In one example embodiment, the system 100 may provide the user the language learning exercise based on his one or more preferences. To select the desirable expressions from the corpus 20 for generating a language exercise that is tailor made for the user, there is also provided a characteristic selection module 140 arranged to select a natural language expression 22 based on a user desired characteristic 50.

For instance, the user may generate an exercise from the system 100 for their language learning based on one or more user desired characteristics 50, such as expression type associated with the complexity of the structure of the selected natural language expression 22, expression complexity associated with the desired number and/or format of the simplified expression portion 24, 26 presented to the user, subject domain associated with a user desired interest area, and vocabulary level which is dependent upon a desirable vocabulary source selected by the user or the combination thereof.

In one specific embodiment, the user may be prompted by the characteristic selection module 140 to input one or more of the following characteristics 50 into the system 10:

1. Type of sentences (e.g. subordination, adjectival clauses, participial phrases, or appositive phrases) to be handled in the exercise, for example from a dropdown list of complex sentence types;
2. Complexity of the exercise, i.e. the number of simplifier sentences to be rewritten into a user expression;
3. Subject domain e.g. academics subject, transportation, school, sport, etc.;
4. Vocabulary level e.g. primary school, high school etc.

Based on the user input characteristic 50, the corpus selection module 110 may refer to the corpus 20 and select the language expression 22 with the matching indications 55. For instance, the system 100 may retrieve only the language expressions 22 in the corpus 20 that are of the sentence type, subject domain, and vocabulary level of the student by one or more of the following steps:

1. Parsing the sentence in the corpus 20 for the desired sentence type/patterns by determining the word type, punctuation, grammatical position from a set of predefined rules;
2. Referring to the user selected sentence complexity;
3. Keyword searches of user interest area;
4. Vocabulary level of the student may be matched by referring to online sources The inventors also devised the use of syntactic simplification technology, particularly but not limited to, in the system 100 for facilitating natural language interactions. The task of text simplification aims to review the structure of a sentence 22 in a corpus 20 and rewrite the sentence 22 so as to reduce its complexity, while preserving its meaning and grammaticality in the simplified form.

Figure 3:
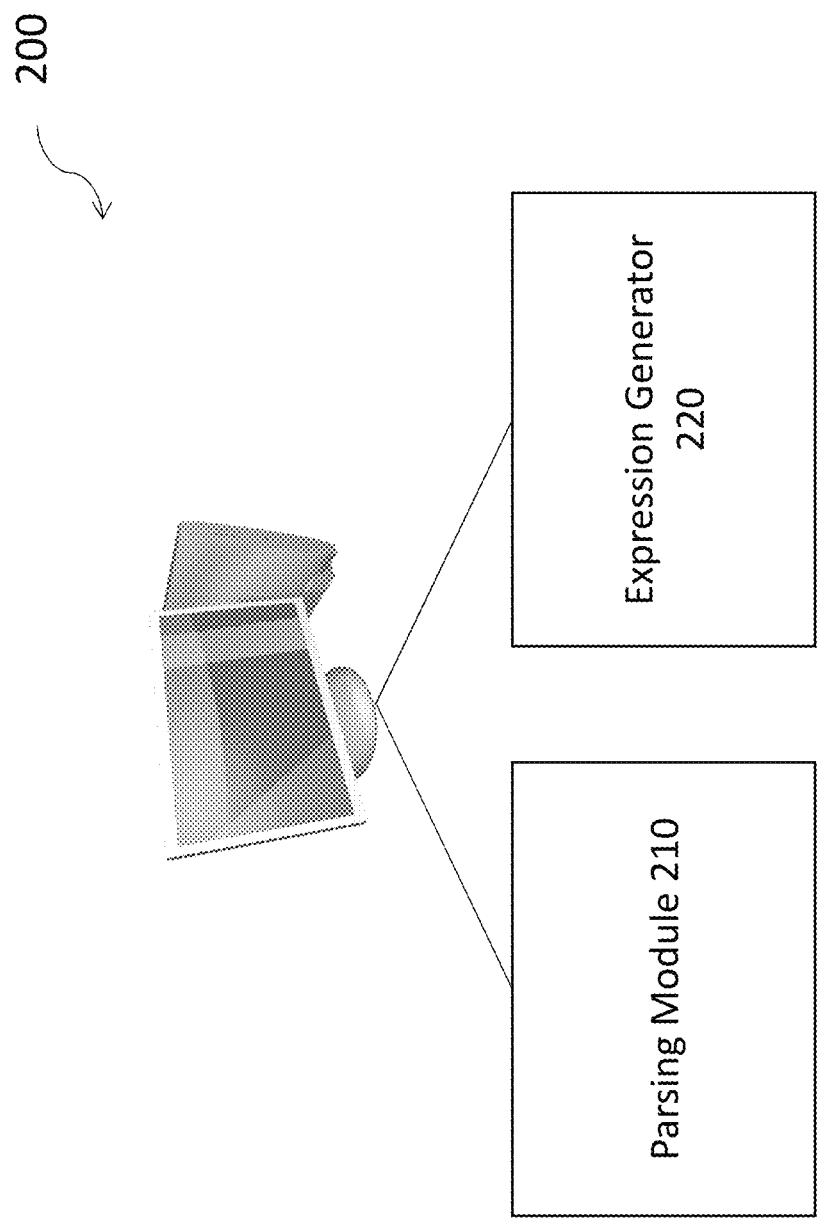
FIG. 3 is a schematic diagram showing the principal components of a system for simplifying an expression in accordance with one embodiment of the present invention.

With reference to FIG. 3, there is provided an example embodiment of a system 200 for processing a natural language expression 22, comprising: a parsing module 210 arranged to parse the natural language expression 22 to identify one or more expression types 60; an expression generator 220 arranged to use the identified one or more expression types 60 to generate a plurality of simplified expression portions 24, 26; wherein the plurality of simplified expression portions 24, 26 is representative of the meaning of the natural language expression 22; and, wherein the one or more expression types 60 is selected for use to generate the plurality of simplified expression portions 24, 26 based on one or more pre-trained conditions 310, 320, 330, 340.

Figure 4:
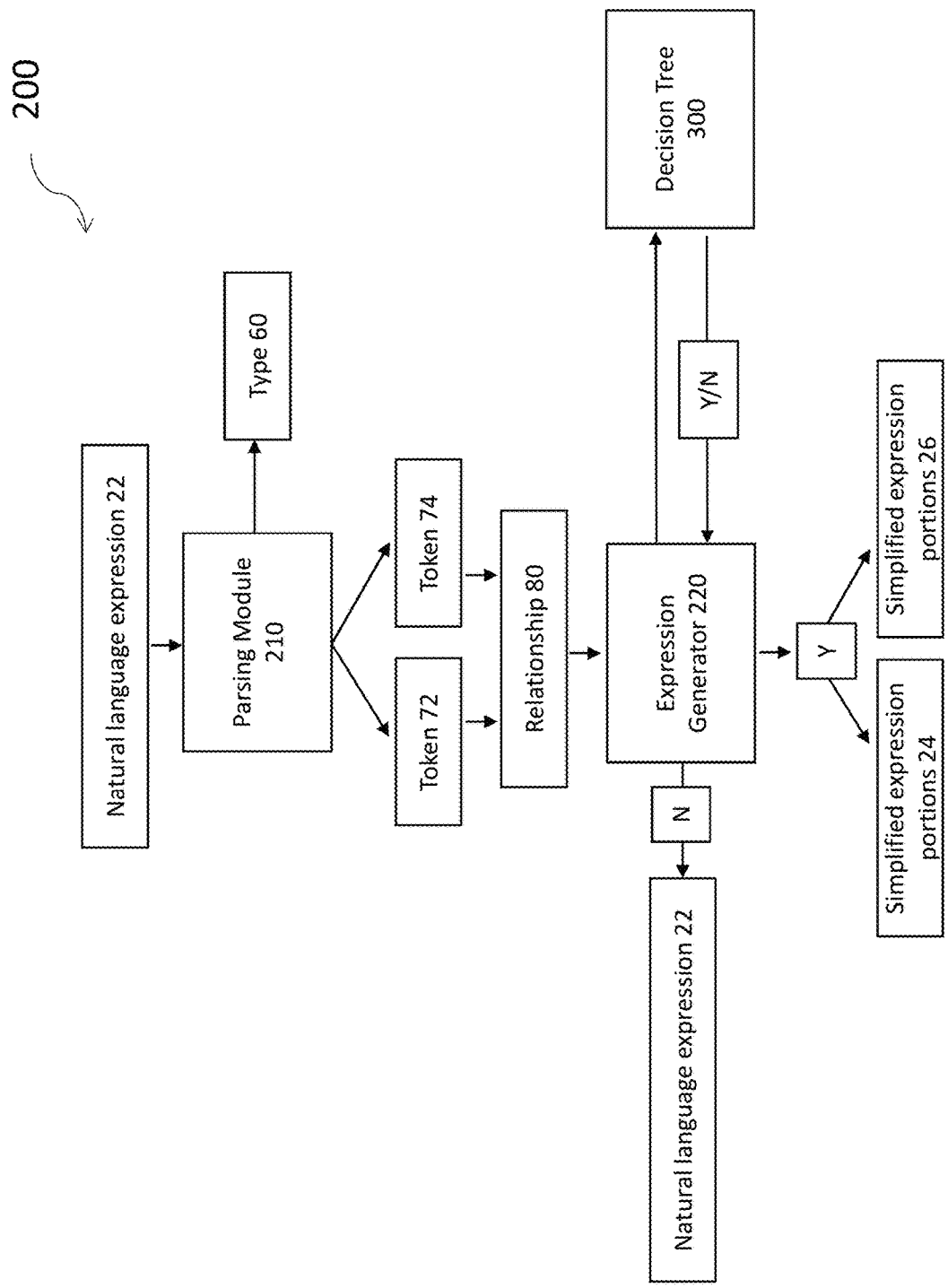
FIG. 4 is a schematic diagram showing the workflow of the system in FIG. 3 and its interactions with a decision tree.

In one example embodiment as shown in FIG. 4, the parsing module 210 initially parses a natural language expression 22 to identify the expression type 60 of the natural language expression 22 by analysing the meaning and/or structure of the natural language expression 22. The parsed natural language expression 22 breaks down and forms a plurality of tokens 72, 74 e.g. individual words, each being representative of a characteristic of the natural language expression, from the parsed natural language expression 22 based on the identified type 60 of the natural language expression 22.

Once the natural language expression 22 is parsed into tokens 72, 74, specific relationships 80 such as conjunct (conj), clausal complement (ccomp), relative clause modifier (acl:relcl), clausal modifier of noun i.e. adjectival clause (acl), appositional modifier (appos), adverbial clause modifier (advcl), open clausal complement (xcomp), or parataxis may be identified by the parsing module 210. Based on one or more determined relationships 80 between these tokens 72, 74, the expression generator 220 generates a plurality of simplified expression portions 24, 26 from the natural language expression 22.

In one specific embodiment, the parsing module 210 may include one or more following transformation patterns and rules as shown in Table 1 below for determining one or more relationships 80 between the tokens 72, 74 parsed from the natural language expression 22:

TABLE 1

Transformation patterns and rules

Coordination

The parent word in the 'conj' relation must be root.
Comma must be present between parent and child words in 'ccomp' relation
Adjectival clauses

Child word must be modified by a word with Pos tag WP, WRB, WPs or WDT
Participial phrases

Child word must not be modified by a word with POS tag IN or TO
Appositive phrases

Subordination

Comma must be present between parent and child words in 'xcomp' relation
Child word must not be modified by a word with POS tag TO
Punctuation/Parataxis

Parent word must be root.

Optionally, the plurality of simplified expression portions 24, 26 may be further regenerated by the expression generator 220 into a plurality of regenerated expression portions with a correct form based on one or more predetermined conditions associated with the structure of the plurality of simplified expression portions 24, 26. For instance, this may be achieved by looking for certain parameters in the simplified expression portions 24, 26, such as pronouns or grammar tenses, and subsequently replacing the identified parameters with predetermined wordings e.g. a noun or a definite verb.

To facilitate the generation of expression, the system 200 further comprises a predetermined decision tree 300 with pre-trained conditions 310, 320, 330, 340 for processing the natural language expression 22 to be simplified to determine the feasibility of the generating of the simplified expression portions 24, 26 before the expression generator 220 eventually splits the natural language expression 22. This improves the accuracy of the splitting and avoids any non-sensible splitting, which may in result generating incorrect simplified sentence portions to confuse the user.

Figure 5:
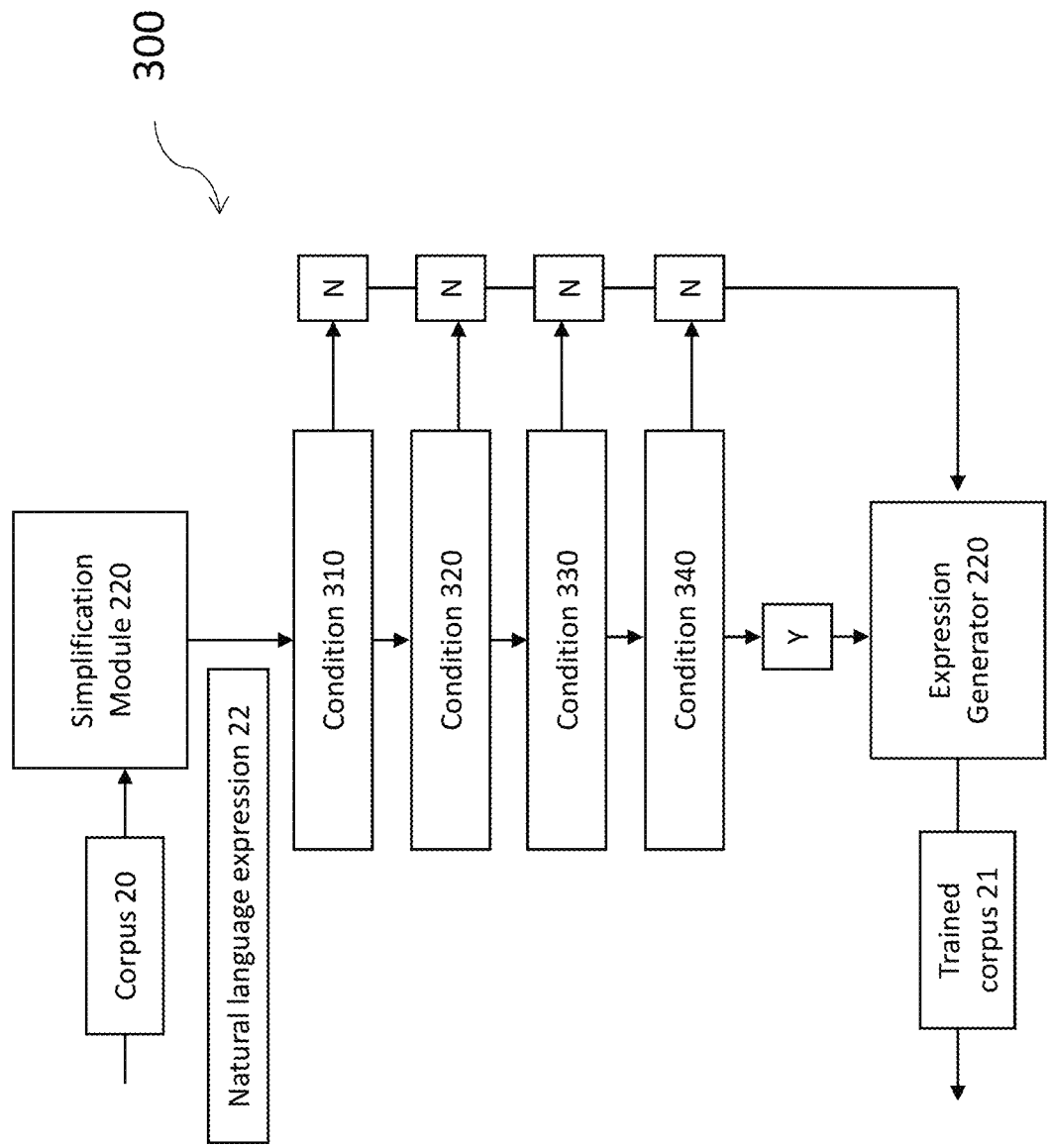
FIG. 5 is a schematic diagram showing the workflow of a decision tree interacting with the system in FIG. 3.

With reference to FIG. 5, the decision tree 300 includes a plurality of pre-trained conditions 310, 320, 330, 340 each of which to be satisfied by the natural language expression 22 before the expression generator 220 proceeds to simplify the natural language expression 22 into a plurality of simplified expression portions 24, 26. In certain types of expression, only some of the rules/questions/conditions in the decision tree 300 would be applicable.

For instance, a corpus 20 may include a plurality of expressions 22 and each of which will go through every applicable pre-trained conditions 310, 320, 330, 340 in the decision tree 300 in a progressive and sequential manner. The processing of an expression 22 in the decision tree 300 will be terminated even if only one of the pre-trained conditions 310, 320, 330, 340 stored therein is not satisfied. The next expressions 22 of the corpus 20 will be handled by the decision tree 300 with the same logic until all expressions 22 in the corpus 20 are trained by the decision tree 300. Accordingly, the trained corpus 21 would be stored in the expression generator 220 of the system 200 as a reference source for the system 100 or other suitable systems.

In one specific embodiment, the pre-trained conditions 310, 320, 330, 340 may include one or more following conditions learned by the decision tree 300 for processing one or more expressions 22 of the corpus 20 during the training:

Is the text span removed from the sentence?
Is the relationship 80 "conj", "ccomp", "acl:relcl", "acl", "appos", "advcl", "xcomp", or "parataxis"?
Is the Part of speech (POS) tag of the parent word adjective (JJ), noun phrase (N*), past participle (VBN), verb+ing (VBG), or verb phrase (V*)?
Is the POS tag of the child word JJ, N*, VBN, VBG, or V*?
Is the parent word the root?
Is the parent word modified by a word with POS tag including prepositions and subordinating conjunctions (IN), to (TO), wh-pronoun e.g. what, which, who, whoever (WP), wh-abverb (WRB), possessive wh-pronoun e.g. whom, whose (WP$), wh-determiner e.g. what, whatever, which NOT occurring at the beginning of a sentence (WDT)?
Is the child word modified by a word with POS tag including IN, TO, WP, WRB, WP$, WDT?
Is there a comma between the parent word and the child word?

Figure 6:
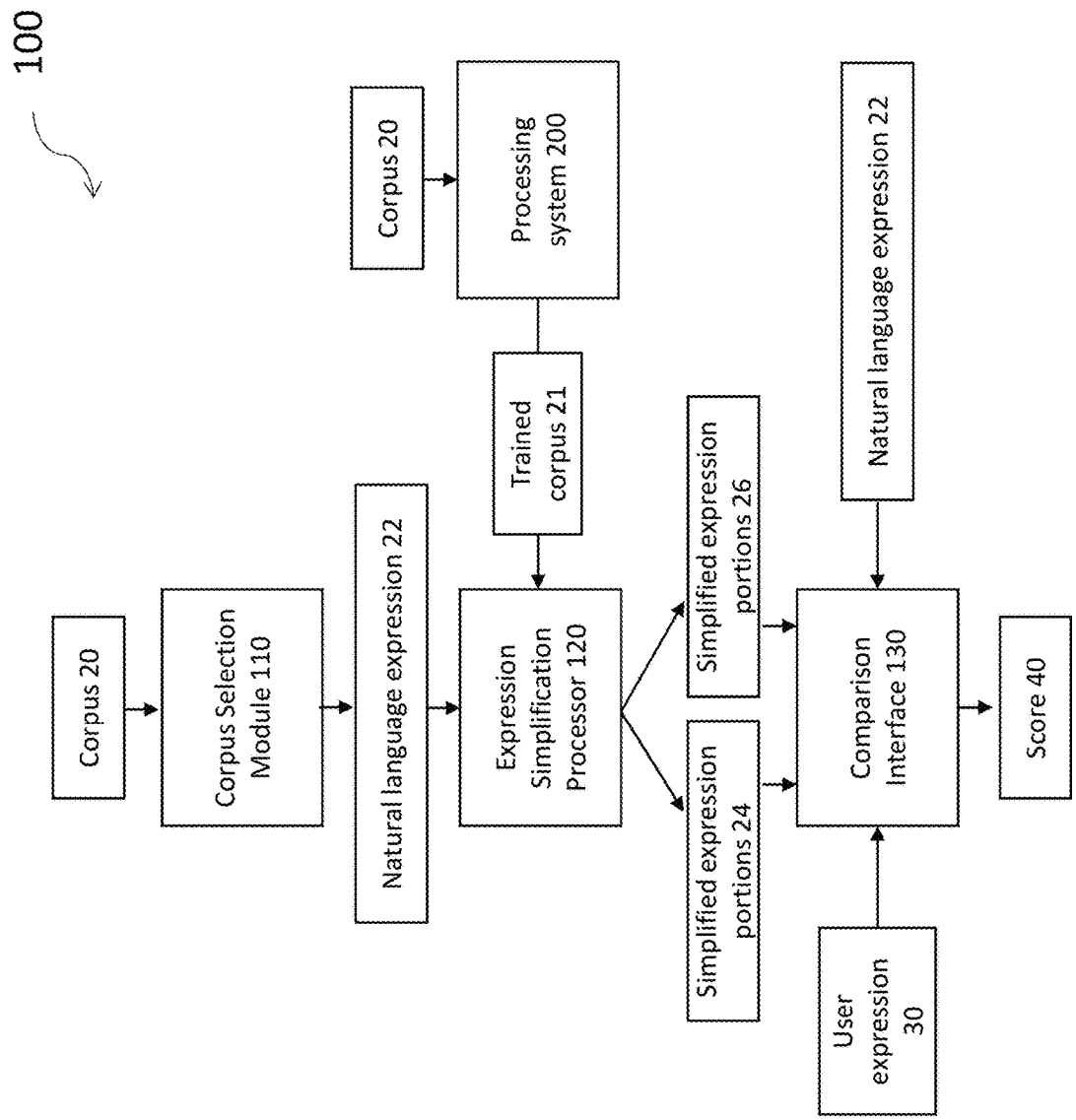
FIG. 6 is a schematic diagram showing the workflow of the system in FIG. 1 and its interactions with the system in FIG. 3.

With reference finally to FIG. 6, there is provided an example embodiment of a system 100 for facilitating natural language interactions comprising a corpus selection module 110, an expression simplification processor 120 and a comparison interface 130. A corpus 20 may be pre-trained by the system 200 as a trained corpus 21 and stored in the expression generator 220 thereof.

During the natural language interactions, the corpus selection module 110 may select one or more natural language expressions 22 from the corpus 20 and the expression simplification processor 120 may refer to the trained corpus 21 stored in the expression generator 220, thereby determining whether the natural language expression 22 is suitable for simplifying into a plurality of simplified expressions 24, 26.

In one example embodiment, the corpus selection module 110 initially parses the corpus 20 to select one or more natural language expressions 22. Prior to simplifying the expressions 22 into a plurality of simplified expressions 24, 26, the expression simplification processor 120 recalls the trained corpus 21 stored in the expression generator 220 of the system 200 and request a feedback concerning the suitability of the splitting.

If the expression generator 220 provides a positive feedback, the expression simplification processor 120 will split the natural language expression 22 into a plurality of simplified expression portions 24, 26 based on the trained corpus 21. To the contrary, if the expression generator 220 provides a negative feedback, the expression simplification processor 120 will dismiss the current natural language expression 22. The corpus selection module 110 will select another natural language expression 22 from the corpus 20 and the expression simplification processor 120 will refer to the expression generator 220 again to determine the suitability of the splitting.

In some embodiments, a number of natural language expressions 22 may be selected from the corpus 20 by the corpus selection module 110 and handled by the expression simplification processor 120, until the expression simplification processor 120 has simplified sufficient numbers of natural language expressions 22 to sets of corresponding simplified expression portions 24, 26.

As one illustrative example, there is shown an application of syntactic simplification, in particular using the system 100 for facilitating natural language interactions, together with the system 200 for splitting a complex natural language expression 22, e.g. "The professor, carrying numerous books, entered the room." into two, simplified expressions 24, 26 "The professor entered the room" and "He was carrying many books".

In this language expression 22, it contains a participial phrase, "carrying numerous books". Based on the corpus 21 stored in the system 200, the expression simplification processor 120 may remove this phrase from the input sentence 22 and further construct the second simplified expression 26 out of the phrase, by turning the participle "carrying" into the finite form "was carrying".

Lastly, the expression simplification processor 120 may recognise "the professor" in the input sentence 22 as the referent noun phrase for the participle phrase "was carrying", and regenerate the pronoun "he" as the subject of the second simplified expression 26. The two simplified expressions 24, 26 are presented to the user by the comparison interface 130.

In some embodiments, the present invention may generate an arbitrary number of exercises at any time, for repeated practice at a user's convenience. The user may practice as many exercises as possible without being limited by the availability of learning materials.

In some embodiments, the present invention may also utilize carrier sentences whose subject is of personal interest, to increase the user's motivation to complete the exercises. By providing language exercise that is of the interest area of the user, the user may find language learning more interesting and this may improve his user experience.

In some embodiments, the present invention may also utilize carrier sentences of appropriate syntactic and lexical complexity, to fit the user's language proficiency. For instance, the user may be tested by the language exercise with the right level of vocabulary and complexity of sentence structure. Any exercise that is out of the scope of their learning syllabus may be prevented from discouraging the user.

In some embodiments, the present invention may also receive instant feedback on the correctness of his/her answer. The user may attempt the language exercise any time and the answer may be assessed without the guidance of a tutor/teacher. The user may attempt the language exercise any time and without the guidance of a tutor/teacher.

It will be appreciated by persons skilled in the art that although the embodiments comprising the systems 100 and 200 are applied to rewriting language expression, these embodiments may be applied in any other applications of language learning such as speaking, listening of language, translation between two languages in other form such as matching and multiple choice exercises with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of processing a natural language expression, comprising the steps of:
    processing the natural language expression by a predetermined decision tree with one or more pre-trained conditions to determine the feasibility of generating of a plurality of simplified expression portions;
    parsing the natural language expression to identify one or more expression types;
    using the identified one or more expression types to generate a plurality of simplified expression portions; wherein the plurality of simplified expression portions is representative of the meaning of the natural language expression; and,
    wherein the step of generating the plurality of simplified expression portions includes selecting the one or more expression types for use to generate the plurality of simplified expression portions based on one or more of the one or more pre-trained conditions.

2. A method of processing a natural language expression in accordance with claim 1, further including the step of regenerating the plurality of simplified expression portions.

3. A method of processing a natural language expression in accordance with claim 1, wherein the natural language expression is parsed to identify the expression type by analysing the meaning and/or structure of the natural language expression.

4. A method of processing a natural language expression in accordance with claim 3, wherein the step of parsing the natural language expression includes forming a plurality of tokens from the parsed natural language expression based on the identified type of the natural language expression.

5. A method of processing a natural language expression in accordance with claim 4, wherein the step of parsing the natural language expression further includes determining the relationship between the meaning of the formed plurality of tokens.

6. A method of processing a natural language expression in accordance with claim 5, wherein the step of generating the plurality of simplified expression portions further includes generating the plurality of simplified expression portions based on the determined relationship.

7. A method of processing a natural language expression in accordance with claim 1, wherein the plurality of simplified expression portions is generated from the processed natural language expression if all the pre-trained conditions in the decision tree are satisfied.

8. A method of processing a natural language expression in accordance with claim 7, wherein the processing of the decision tree is terminated if one of the pre-trained conditions of the decision tree is not satisfied.

9. A method of processing a natural language expression in accordance with claim 4, wherein each of the formed plurality of tokens is representative of a characteristic of the natural language expression.

10. A method of processing a natural language expression in accordance with claim 2, wherein the plurality of simplified expression portions are regenerated based on one or more predetermined conditions associated with the structure of the plurality of simplified expression portions.

11. A method of facilitating natural language interactions comprising the steps of:
    processing a corpus to select a natural language expression from the corpus;
    simplifying the selected natural language expression into a plurality of simplified expression portions; wherein the plurality of simplified expression portions is representative of the meaning of the selected natural language expression; and,
    presenting the plurality of simplified expression portions to a user so as to receive a user expression from the user for comparison with the selected natural language expression;
wherein the selected natural language expression is simplified into a plurality of simplified expression portions based on the result from the method of processing a natural language expression in accordance with claim 1.

12. A system for processing a natural language expression, comprising:
    a predetermined decision tree with one or more pre-trained conditions to determine the feasibility of generating a plurality of simplified expression portions;
    a parsing module arranged to parse the natural language expression to identify one or more expression types;
    an expression generator arranged to use the identified one or more expression types to generate a plurality of simplified expression portions; wherein the plurality of simplified expression portions is representative of the meaning of the natural language expression; and,
    wherein the one or more expression types is selected for use to generate the plurality of simplified expression portions based on one or more of the one or more pre-trained conditions.

13. A system for processing a natural language expression in accordance with claim 12, wherein the plurality of simplified expression portions are regenerated to a plurality of regenerated expression portions.

14. A system for processing a natural language expression in accordance with claim 12, wherein the parsing module parses the natural language expression to identify the expression type by analysing the meaning and/or structure of the natural language expression.

15. A system for processing a natural language expression in accordance with claim 14, wherein the parsing module forms a plurality of tokens from the parsed natural language expression based on the identified type of the natural language expression.

16. A system for processing a natural language expression in accordance with claim 15, wherein the parsing module determines the relationship between the meaning of the formed plurality of tokens.

17. A system for processing a natural language expression in accordance with claim 16, wherein the expression generator generates the plurality of simplified expression portions based on the determined relationship.

18. A system for processing a natural language expression in accordance with claim 12, wherein the plurality of simplified expression portions is generated from the processed natural language expression if all the pre-trained conditions in the decision tree are satisfied.

19. A system for processing a natural language expression in accordance with claim 18, wherein the processing of the decision tree is terminated if one of the pre-trained conditions of the decision tree is not satisfied.

20. A system for processing a natural language expression in accordance with claim 15, wherein each of the formed plurality of tokens is representative of a characteristic of the natural language expression.

21. A system for processing a natural language expression in accordance with claim 13, wherein the plurality of simplified expression portions is regenerated based on one or more predetermined conditions associated with the structure of the plurality of simplified expression portions.

22. A system for facilitating natural language interactions comprising:

- a corpus selection module arranged to process a corpus to select a natural language expression from the corpus;
- an expression simplification processor arranged to simplify the selected natural language expression into a plurality of simplified expression portions; wherein the plurality of simplified expression portions is representative of the meaning of the selected natural language expression; and
- a comparison interface arranged to present the plurality of simplified expression portions to a user so as to receive a user expression from the user for comparison with the selected natural language expression, wherein the expression simplification processor simplifies the selected natural language expression into a plurality of simplified expression portions based on the result from the system for processing a natural language expression in accordance with claim 12.

* * * * *